Patented Oct. 21, 1941

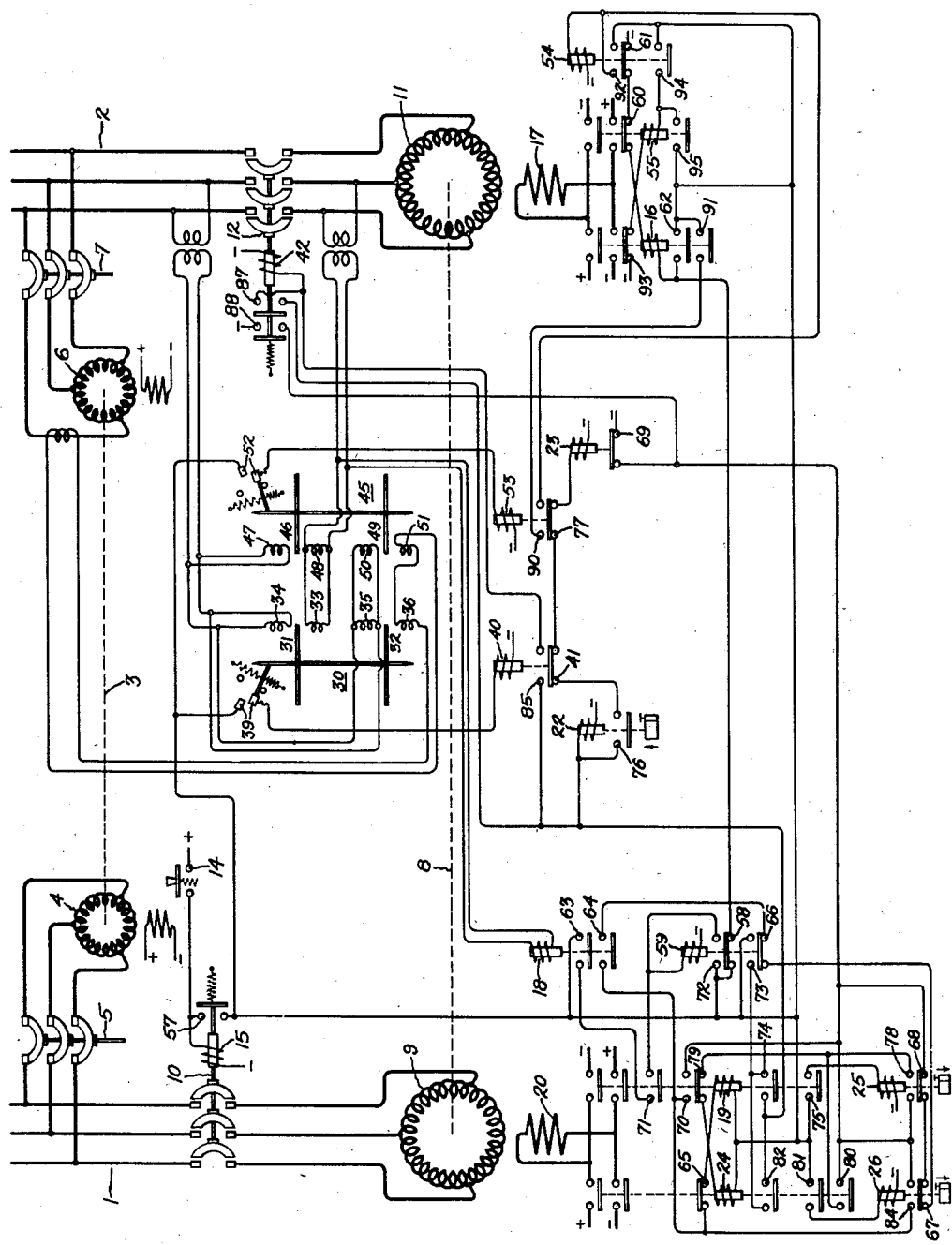

2,259,988

UNITED STATES PATENT OFFICE 2,259,988

AUTOMATIC CONTROL ARRANGEMENT

Herman Bany, Lansdowne, Pa., assignor to General Electric Company, a corporation of New York Application May 20, 1941, Serial No. 394,315

11 Claims. (Cl. 171—118)

My invention relates to automatic control arrangements and particularly to an arrangement for synchronizing two synchronous frequency converters, and its object is to provide an improved arrangement of apparatus for accomplishing this result without requiring the use of stator shifting devices.

In systems of electric distribution in which two energized electric circuits of different frequencies are interconnected by two synchronous frequency converters, it is necessary, in order to obtain satisfactory parallel operation of the two synchronous frequency converters, that the rotors of the two converters have such a spaced relation with respect to each other that the no load voltages across corresponding generator terminals of the two parallel connected converters are in phase.

In accordance with my invention, I accomplish the desired result of obtaining the proper space relation between the rotors of the parallel connected converters by connecting to one of the electric circuits one of the synchronous machines of a synchronous frequency converter that is being synchronized with a synchronous converter already in series so that the incoming synchronous converter runs at synchronous speed with one of its synchronous machines disconnected and then I periodically reverse the excitation of the connected synchronous machine of the converter being synchronized until a predetermined phase relation, which varies with the load on the synchronous converter in service, exists between corresponding voltages of the disconnected synchronous machine of the converter being synchronized and of the circuit to which this disconnected synchronous machine is to be connected. As soon as this predetermined phase relation is obtained, the disconnected synchronous machine is then connected to the circuit to which it is to be connected.

For determining when the proper phase relation exists between the voltages of the disconnected synchronous machine and the circuit to which it is to be connected so as to stop further reversals of the excitation of the connected synchronous machine during the synchronizing operation, I provide a differential relay which has two opposed torque producing elements, one of which produces a torque proportional to the sine of the angle between corresponding voltages of the disconnected synchronous machine of the converter being synchronized and the circuit to which this disconnected machine is to be connected and the other of which produces a torque proportional to the load on the frequency converter in service. These torque producing elements are designed so that they produce equal torques when the voltage of the disconnected synchronous machine leads corresponding voltage of the circuit to which it is to be connected by an amount equal to the load angle of the converter in service, namely, the angle by which the terminal voltage of the generator end of the converter in service lags behind the no load terminal voltage thereof.

My invention will be better understood from the following description when taken in connection with the accompanying drawing the single figure of which diagrammatically illustrates a system of electric distribution embodying my invention, and its scope will be pointed out in the appended claims.

Referring to the drawing, 1 and 2 represent two energized alternating current circuits of different frequencies which are connected together by a suitable synchronous frequency converter 3 comprising a synchronous machine 4 which is connected to the circuit 1 by means of a suitable circuit breaker 5 and which is directly connected to a synchronous machine 6 that is connected to the circuit 2 by means of a suitable circuit breaker 7. 8 represents another synchronous frequency converter comprising a synchronous machine 9 which is adapted to be connected to the circuit 1 by means of a suitable circuit breaker 10 and a synchronous machine 11 which is adapted to be connected to the electric circuit 2 by means of a suitable circuit breaker 12.

For effecting the starting of the frequency converter 8 and the connection thereof between the circuits 1 and 2 while the frequency converter 3 is interconnected between these circuits, I provide a suitable control switch 14 which, when closed in any suitable manner either automatically or manually, effects first the connection of the armature winding of the synchronous machine 9 to the circuit 1 so that the machine 9 starts and accelerates to approximately synchronous speed as an induction motor. In order to simplify the disclosure, I have shown the control switch 14 as controlling an energizing circuit for the closing coil 15 of the circuit breaker 10 so that normal voltage is applied to the armature winding of the machine 9 to start it as an induction motor. It will be obvious, however, that any other suitable arrangement, examples of which are well known in the art, may be employed for starting the converter 8 and bringing it up to synchronous speed.

The closing of the control switch 14 also effects, as soon as the circuit breaker 10 is closed, the completion of an energizing circuit for a field switch 16 associated with the synchronous machine 11 so that the field winding 17 thereof is connected to a suitable source of excitation. Therefore, as the speed of the converter 8 increases, the voltage of the synchronous machine 11 starts to build up and, when it reaches a predetermined value thereby indicating that the speed of the converter 8 is above a predetermined value, a voltage relay 18, which is responsive to the armature voltage of the machine 11, picks up and completes an energizing circuit for the field switch 19 associated with the synchronous machine 9 so that the field winding 20 thereof is energized with direct current to pull the machine 9 into synchronism with the circuit 1. When the machine 9 is pulled into synchronism in this manner, there is a possibility of the machine pulling into synchronism in as many different rotor positions relative to any given position of the rotor of the converter 3 as there are pairs of poles on the machine 9. For example, if the frequencies of the circuits 1 and 2 are 60 and 25 cycles, respectively, and each of the synchronous machines 4 and 9 has 24 poles and each of the synchronous machines 6 and 11 has 10 poles, then machine 9 can pull into synchronism with its rotor in any one of twelve different positions relative to a given position of the rotor of the machine 4. There is, however, only one of these twelve different rotor positions of the machine 9 in which the no load voltage of the machine 11 leads the corresponding voltage of the machine 6 by an amount equal to the load angle of the machine 6.

In accordance with my invention, I provide in the embodiment of my invention shown in the drawing an arrangement for periodically reversing the excitation of the synchronous machine 9 after the initial closure of the field switch 19 until a desired phase relation is established between corresponding terminal voltages of the machines 6 and 11. This result is accomplished by having a time relay 22, which is energized in response to the initial closing of the field switch 19, effect, after being energized for a predetermined time, the energization of an associated control relay 23 which, when energized, effects the opening of the field switch 19 and the subsequent deenergizations of the relays 22 and 23. As soon as the relay 23 becomes deenergized after the field switch 19 opens, a circuit is completed for a field reversing switch 24 through contacts of a time delay dropout relay 25 which is energized when the field switch 19 is closed and is deenergized when the field switch 19 is opened. The closing of the field reversing switch 24 causes the current through the field winding 20 of the machine 9 to reverse so that the rotor of the converter 8 slips back the distance of one pole of the machine 9. The closing of the field reversing switch 24 also effects the energization of the time relay 22 which operates after a predetermined time interval to effect the energization of the associated control relay 23. The relay 23, by opening its contacts, effects the opening of the field reversing switch 24 and the subsequent deenergizations of the relays 22 and 23. As soon as the relay 23 becomes deenergized after the field reversing switch 24 opens, a circuit is completed for the field switch 19 through contacts of the time delay dropout relay 26 which is energized when the field reversing switch 24 is closed and is deenergized when the field reversing switch 24 is opened. The closing of the field switch 24 causes the rotor of the machine 9 to slip another pole and also effects the energization of the relays 22 and 23 so that the field switch 19 is again opened and the field reversing switch 24 is again closed in the manner heretofore described. The excitation of the synchronous machine 9 is periodically reversed in this manner until a desired phase relation is obtained between the voltages of the synchronous machines 6 and 11 when the circuit of the control relay 23 is interrupted so that the energization of the time relay 22 does not effect the energization of the control switch 23 to open whichever one of the field switches associated with the synchronous machine 9 is at that time closed. In order to accomplish this result, I provide a differential relay 30 comprising two opposed torque producing elements 31 and 32. The torque producing element 31 comprises two cooperating windings 33 and 34 respectively connected across corresponding phase conductors of the machines 6 and 11 so that a torque is produced which is substantially proportional to the phase angle displacement between the voltages of two corresponding phases of the machines 6 and 11. The torque producing element 32 comprises two cooperating windings 35 and 36 respectively connected to the machine 6 so as to produce a torque proportional to the load on this machine. When these two torques are equal thereby indicating that the voltage of the machine 11 leads the voltage of the machine 6 by an angle equal to the load angle of the converter 3, passing contacts 39 of the relay 30 are closed by suitable biasing means such as the centering springs 37 and 38 to complete a circuit for a control relay 40 which, by opening its contacts 41, interrupts the energizing circuit of the control relay 23 in order to prevent further reversing of the excitation of the machine 9. The energization of the control relay 40 is also arranged to complete an energizing circuit for the closing coil 42 of the circuit breaker 12 so that the machine 11 is connected to the circuit 2.

In order to decrease the number of field reversals required to obtain the desired phase relation between the voltages of the machines 6 and 11 which effects the closing of the circuit breaker 12, I also provide an arrangement for stopping the periodic reversals of the excitation of the machine 9 and for effecting a reversal of the excitation of the machine 11 when the phase relation between the voltages of the machines 6 and 11 is displaced 180° from the phase relation which effects the closing of the circuit breaker 12. For indicating when the voltage of the machine 11 is 180° displaced from this proper synchronizing value, I provide a differential relay 45 which is similar in construction to the differential relay 30. The relay 45 has a torque producing element 46 comprising the windings 47 and 48 which produce a torque proportional to the phase angle displacement between corresponding voltages of the machines 6 and 11, and an opposing torque producing element 49 comprising the two cooperating windings 50 and 51 which are respectively connected to the machine 6 so as to produce a torque proportional to the load on the machine 6. The connections of the windings of the two torque producing elements 46 and 49, however, are such that the two opposing torques, produced by the torque producing elements 46 and 49, are equal when the voltage of the machine 11 is displaced 180° from the proper synchronizing value. In the arrangement shown this is accomplished by reversing the connections of the winding 47 of relay 45 relative to the connections of the relay 30. When the two opposing torques are equal, the passing contacts 52 of the relay 45 are closed by suitable biasing means such as the centering springs 43 and 44, to complete an energizing circuit for an associated control relay 53. The relay 53, when energized, interrupts the energizing circuit of the control relay 23 so as to prevent further reversals of the excitation of the synchronous machine 9. The energization of the relay 53 also effects the energization of a control relay 54 which, in turn, effects the opening of the field switch 16 and the closing of a field reversing switch 55 associated with the synchronous machine 11 so that the current through the field winding 17 of the synchronous machine 11 is reversed. This reversal of the excitation of the machine 11 produces the proper phase relation between the voltages of the machines 6 and 10 so that the relay 30 operates to effect the closing of the circuit breaker 12.

The operation of the arrangement shown in the drawing is as follows:

When the converter 8 is to be placed in operation, the control switch 14 is closed to complete an energizing circuit for the closing coil 15 of the circuit breaker 10 so that the armature winding of the machine 9 is connected directly to the alternating current circuit 1. The machine 9 then starts and accelerates as an induction motor to bring the frequency converter 8 up to approximately synchronous speed. By closing its auxiliary contacts 57, the circuit breaker 10 completes an energizing circuit for the operating winding of the field switch 16 for the machine 11 so that the field winding 17 of the machine 11 is connected to a suitable source of excitation. The energizing circuit of the operating winding of the field switch 16 also includes the contacts of the control switch 14, the contacts 58 of a control relay 59 associated with the voltage relay 18, the contacts 60 of the field reversing switch 55, and the contacts 61 of the control relay 54. By closing its auxiliary contacts 62, the field switch 16 completes a shunt circuit around the contacts 58 of the control relay 59.

When the speed of the converter 8 increases above a predetermined value, the voltage relay 18, which is responsive to the voltage of the machine 11, picks up and closes its contacts 63 and 64. The closing of the contacts 64 completes an energizing circuit for the operating winding of the field switch 19 so that the field winding 20 is excited with direct current to pull the machine 9 into synchronism with the circuit 1. The energizing circuit of the operating winding of the field switch 19 also includes the contacts of the control switch 14, the auxiliary contacts 57 of the circuit breaker 10, the auxiliary contacts 65 of the field reversing switch 24, the contacts 66 of the control relay 59, the contacts 67 of the control relay 26, the contacts 68 of the control relay 25 and the contacts 69 of the control relay 23. By closing its auxiliary contacts 70, the field switch 19 completes a shunt circuit around the series connected contacts 64, 65, 67 and 68. By closing its auxiliary contacts 71, the field switch 19 completes an energizing circuit for the control relay 59 through the contacts 63 of the voltage relay 18, the auxiliary contacts 57 of the circuit breaker 10, and the contacts of the control switch 14. By closing its contacts 72, the control relay 59 completes a shunt circuit around the contacts 63 and 71, and by closing its contacts 73, the relay 59 completes an energizing circuit for the time relay 22 through auxiliary contacts 74 of the field switch 19, the auxiliary contacts 57 of the circuit breaker 10, and the contacts of the control switch 14. The closing of the auxiliary contacts 75 of the field switch 19 also completes an energizing circuit for the time delay dropout relay 25 through the contacts 57 of the circuit breaker 10 and the contacts of the control switch 14.

If the proper phase relation does not exist between the voltages of the machines 6 and 11 when the field switch 19 is closed, the time relay 22, after being energized for a predetermined time, closes its contacts 76 and completes an energizing circuit for the control relay 23 through the contacts of the control switch 14, the auxiliary contacts 57 of the circuit breaker 10, the contacts 73 of the relay 59, the auxiliary contacts 74 of the field switch 19, the contacts 41 of the relay 40, and the contacts 77 of the relay 53. The opening of the contacts 69 of the relay 23 interrupts the heretofore described circuit for the operating winding of the field switch 19 so that the field switch 19 opens to remove excitation from the field winding 20. The opening of the auxiliary contacts 74 of the field switch 19 interrupts the energizing circuits heretofore described for the relays 22 and 23 so that these relays are immediately restored to their normally deenergized positions. The opening of the auxiliary contacts 75 of the field switch 19 interrupts the energizing circuit for the time delay dropout relay 25, but this relay does not open its contacts 78 and close its contacts 68 until after the relay winding has been deenergized for a predetermined time. Therefore, as soon as the relay 23 closes its contacts 69, an energizing circuit is completed for the operating coil of the field reversing switch 24 through the contacts of the control switch 14, the auxiliary contacts 57 of the circuit breaker 10, the auxiliary contacts 79 of the field switch 19, and the contacts 78 of the control relay 25. The closing of the field reversing switch 24 connects the field winding 20 to the source of excitation so as to reverse the current through it and thereby cause the machine 9 to slip a pole. The closing of the auxiliary contacts 80 of the field reversing switch 24 completes a shunt circuit around the contacts 78 so that the field reversing switch remains closed after the time delay dropout relay 25 opens its contacts 78. The closing of the auxiliary contacts 81 of the field reversing switch 24 completes an energizing circuit for the time delay dropout relay 26 through the auxiliary contacts 57 of the circuit breaker 10 and the contacts of the control switch 14. The closing of the auxiliary contacts 82 of the field reversing switch 24 completes an energizing circuit for the time relay 22 through the contacts 73 of the relay 59, the auxiliary contacts 57 of the circuit breaker 10, and the contacts of the control switch 14.

If, after the field reversing switch 24 is closed, the phase relation between the voltages of the synchronous machines 6 and 11 is not such as to cause either the relay 30 to close its contacts 39 or the relay 45 to close its contacts 52, the closing of the contacts 76 of the time relay 22 completes an energizing circuit for the relay 23 through the contacts 77 of the relay 53, the contacts 41 of the relay 40, the contacts 82 of the field reversing switch 24, the contacts 73 of the relay 59, the auxiliary contacts 57 of the circuit breaker 10, and the contacts of the control switch 14. The opening of the contacts 69 of the relay 23 interrupts the heretofore described energizing circuit for the operating winding of the field reversing switch 24 so that this switch 24 opens and disconnects the field winding 20 from the source of excitation. The opening of the auxiliary contacts 82 of the field reversing switch 24 interrupts the heretofore described energizing circuits for the relays 22 and 23, and the opening of the auxiliary contacts 81 of the field reversing switch 24 interrupts the heretofore described energizing circuit for the time delay dropout relay 26. Before the relay 26 opens its contacts 84, however, the relay 23 closes its contacts 69 and completes, through the contacts 84, an energizing circuit for the operating winding of the field switch 19. This energizing circuit also includes the auxiliary contacts 65 of the field reversing switch 24, the auxiliary contacts 57 of the circuit breaker 10, and the contacts of the control switch 14. The closing of the field switch 19 causes another reversal of current through the field winding 20 so that the machine 9 slips another pole.

This field reversing operation of the machine 16 is periodically repeated until the phase relation between the voltages of the machines 6 and 11 is such that either the relay 30 closes its contacts 39 or the relay 45 closes its contacts 52. If the relay 30 closes its contacts 39 first thereby indicating that the proper phase relation exists between the voltages of the machines 6 and 11 to allow the circuit breaker 12 to be closed, an energizing circuit for the relay 40 is completed by the closing of the contacts 39. The opening of the contacts 41 of the relay 40 interrupts the energizing circuit of the relay 23 so as to prevent further reversals of the excitation of the machine 9, and the closing of the contacts 85 of the relay 40 completes an energizing circuit for the closing coil 42 of the circuit breaker 12 through contacts 74 of the field switch 19 or the contacts 82 of the field reversing switch 24, depending upon which of these two switches is closed, the contacts 73 of relay 59, the auxiliary contacts 57 of the circuit breaker 10, and the contacts of the control switch 14. The closing of the circuit breaker 12 connects the synchronous machine 11 to the circuit 2 so that the converter 8 then assumes its proper share of the load connected to the circuit 2.

The closing of the auxiliary contacts 87 of the circuit breaker 12 completes a shunt circuit around the contacts 85 in the energizing circuit of the closing coil 42, and the closing of the auxiliary contacts 88 of the circuit breaker 12 completes a shunt circuit around the contacts 69 in the circuit of the operating coil of whichever one of the field switches 19 and 24 is closed at this time.

If the proper phase relation between the voltages of the machines 6 and 11 is established to cause the relay 45 to close its contacts 52 before the relay 30 closes its contacts 35, an energizing circuit is completed for the relay 53 as soon as the contacts 52 are closed. The opening of the contacts 77 of the relay 53 interrupts the energizing circuit of the relay 23 so as to prevent further reversals of the excitation of the machine 9, and the closing of the contacts 90 of the relay 53 completes an energizing circuit for the relay 54 through contacts 91 of the field switch 16, the auxiliary contacts 57 of circuit breaker 10, and the contacts of the control switch 14. The closing of the contacts 92 of the relay 54 completes a shunt circuit around the contacts 90 and 91 in the energizing circuit of the relay 54, and the opening of the contacts 61 of the relay 54 interrupts the heretofore described energizing circuit for the operating winding of the field switch 16 so that this field switch opens and disconnects the source of excitation from the field winding 17. The closing of the auxiliary contacts 93 of the field switch 16 completes an energizing circuit for the operating winding of the field reversing switch 55 through contacts 94 of the relay 54, the auxiliary contacts 57 of the circuit breaker 10, and the contacts of the control switch 14. The closing of the auxiliary contacts 95 of the field reversing switch 55 completes a shunt circuit around the contacts 94 in the energizing circuit of the operating winding of the field reversing switch 55. The closing of the field reversing switch causes the current in the field winding 17 to reverse so that the proper phase relation is established between the voltages of the synchronous machines 6 and 11 to cause the relay 30 to close its contacts 39 and effect the closing of the circuit breaker 12 in the manner heretofore described so that the machines 6 and 11 are connected in parallel.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, two electric circuits, a frequency converter having two synchronous machines respectively connected to said circuits, a second frequency converter having one synchronous machine connected to one of said circuits and driving a second synchronous machine which is adapted to be connected to the other of said circuits, means for periodically reversing the excitation of said one synchronous machine, and means responsive to a predetermined relation between the load angle of said first mentioned converter and the angular relation of corresponding voltages of said second synchronous machine and said other circuit for preventing further reversals of the excitation of said one synchronous machine.

2. In combination, two electric circuits, a frequency converter having two synchronous machines respectively connected to said circuits, a second frequency converter having one synchronous machine connected to one of said circuits and driving a second synchronous machine which is adapted to be connected to the other of said circuits, means for periodically reversing the excitation of said one synchronous machine, and means responsive to a predetermined relation between the load angle of said first mentioned converter and the angular relation of corresponding voltages of said second synchronous machine and said other circuit for preventing further reversals of the excitation of said one synchronous machine and for connecting said second synchronous machine to the other of said circuits.

3. In combination, two electric circuits, a frequency converter having two synchronous machines respectively connected to said circuits, a second frequency converter having one synchronous machine connected to one of said circuits and driving a second synchronous machine which is adapted to be connected to the other of said circuits, means for periodically reversing the excitation of said one synchronous machine, and means responsive to a predetermined relation between the load angle of said first mentioned converter and the angular relation of corresponding voltages of said second synchronous machine and said other circuit for preventing further reversals of the excitation of said one synchronous machine and for reversing the excitation of said second synchronous machine.

4. In combination, two electric circuits, a frequency converter having two synchronous machines respectively connected to said circuits, a second frequency converter having one synchronous machine connected to one of said circuits and driving a second synchronous machine which is adapted to be connected to the other of said circuits, means for periodically reversing the excitation of said one synchronous machine, means responsive to a predetermined relation between the load angle of said first mentioned converter and the angular relation of corresponding voltages of said second synchronous machine and said other circuit for preventing further reversals of the excitation of said one synchronous machine and for reversing the excitation of said second synchronous machine, and means responsive to a different predetermined relation between the load angle position of said first mentioned converter and the angular relation of corresponding voltages of said second mentioned converter and said other circuit for preventing further reversals of the excitation of said one synchronous machine.

5. In combination, two electric circuits, a frequency converter having two synchronous machines respectively connected to said circuits, a second frequency converter having one synchronous machine connected to one of said circuits and driving a second synchronous machine which is adapted to be connected to the other of said circuits, means for periodically reversing the excitation of said one synchronous machine, means responsive to a predetermined relation between the load angle of said first mentioned converter and the angular relation of corresponding voltages of said second synchronous machine and said other circuit for preventing further reversals of the excitation of said one synchronous machine and for reversing the excitation of said second synchronous machine, and means responsive to a different predetermined relation between the load angle position of said first mentioned converter and the angular relation of corresponding voltages of said second mentioned converter and said other circuit for preventing further reversals of the excitation of said one synchronous machine and for connecting said second synchronous machine to the other of said circuits.

6. In combination, two electric circuits, a frequency converter having two synchronous machines respectively connected to said circuits, a second frequency converter comprising two synchronous machines, means for connecting one of said last mentioned machines to one of said circuits and for periodically reversing the excitation thereof, a differential relay comprising a movable element and means for exerting on said element opposing torques respectively proportional to the phase angle displacement between the voltage of the other of said circuits and the voltage of the other of said last mentioned synchronous machines and to the load on said first mentioned converter, and means controlled by said relay for preventing further reversals of the excitation of said one of said last mentioned machines.

7. In combination, two electric circuits, a frequency converter having two synchronous machines respectively connected to said circuits, a second frequency converter comprising two synchronous machines, means for connecting one of said last mentioned machines to one of said circuits and for periodically reversing the excitation thereof, a differential relay comprising a movable element and means for exerting on said element opposing torques respectively proportional to the phase angle displacement between the voltage of the other of said circuits and the voltage of the other of said last mentioned synchronous machines and to the load on said first mentioned converter, and means controlled by said relay for preventing further reversals of the excitation of said one of said last mentioned machines and for connecting the other of said last mentioned synchronous machines to said other of said circuits.

8. In combination, two electric circuits, a frequency converter having two synchronous machines respectively connected to said circuits, a second frequency converter comprising two synchronous machines, means for connecting one of said last mentioned machines to one of said circuits and for periodically reversing the excitation thereof, a differential relay comprising a movable element and means for exerting on said element opposing torques respectively proportional to the phase angle displacement between the voltage of the other of said circuits and the voltage of the other of said last mentioned synchronous machines and to the load on said first mentioned converter, and means controlled by said relay for preventing further reversals of the excitation of said one of said last mentioned machines and for reversing the excitation of said other of said last mentioned synchronous machines.

9. In combination, two electric circuits, a frequency converter having two synchronous machines respectively connected to said circuits, a second frequency converter comprising two synchronous machines, means for connecting one of said last mentioned machines to one of said circuits and for periodically reversing the excitation thereof, a differential relay comprising a movable element and means for exerting on said element opposing torques respectively proportional to the phase angle displacement between corresponding voltages of the other of said circuits and the other of said last mentioned synchronous machines and to the load on said first mentioned converter, means controlled by said relay for preventing further reversals of the excitation of said one of said last mentioned machines, a second differential relay comprising a movable element and means for exerting on said element opposing torques proportional to the phase angle displacement between corresponding voltages of the other of said circuits and the other of said last mentioned synchronous machines and to the load on said first mentioned converter, and means controlled by said second relay for preventing further reversals of the excitation of said one of said synchronous machines.

10. In combination, two electric circuits, a frequency converter having two synchronous machines respectively connected to said circuits, a second frequency converter comprising two synchronous machines, means for connecting one of said last mentioned machines to one of said circuits and for periodically reversing the excitation thereof, a differential relay comprising a movable element and means for exerting on said element opposing torques respectively proportional to the phase angle displacement between corresponding voltages of the other of said circuits and the other of said last mentioned synchronous machines and to the load on said first mentioned converter, means controlled by said relay for preventing further reversals of the excitation of said one of said last mentioned machines, a second differential relay comprising a movable element and means for exerting on said element opposing torques proportional to the phase angle displacement between corresponding voltages of the other of said circuits and the other of said last mentioned synchronous machines and to the load on said first mentioned converter, and means controlled by said second relay for preventing further reversals of the excitation of said one of said synchronous machines and for connecting said other of said last mentioned synchronous machines to said other of said circuits.

11. In combination, two electric circuits, a frequency converter having two synchronous machines respectively connected to said circuits, a second frequency converter having one synchronous machine connected to one of said circuits and driving a second synchronous machine which is adapted to be connected to the other of said circuits, means responsive to a predetermined relation between load angle of said first mentioned converter and the angular relation of corresponding voltages of said second synchronous machine and said other circuit for connecting said second synchronous machine to the other of said circuits.

HERMAN BANY.